US012708576B2

(12) United States Patent
Mauser et al.

(10) Patent No.: US 12,708,576 B2
(45) Date of Patent: Aug. 18, 2026

(54) PATIENT COMPLIANCE MONITORING SYSTEM

(71) Applicant: Recovery Force, LLC, Fishers, IN (US)

(72) Inventors: Kevin A. Mauser, Indianapolis, IN (US); Jeffrey Schwegman, Indianapolis, IN (US); Jason M. Bobay, Fishers, IN (US); Vincent Rizzo, Westfield, IN (US); Matthew Wyatt, Fishers, IN (US)

(73) Assignee: Recovery Force, LLC, Fishers, IN (US)

( * ) Notice: Subject to any disclaimer, the term of this patent is extended or adjusted under 35 U.S.C. 154(b) by 503 days.

(21) Appl. No.: 17/648,947

(22) Filed: Jan. 26, 2022

(65) Prior Publication Data

US 2022/0233378 A1 Jul. 28, 2022

Related U.S. Application Data

(60) Provisional application No. 63/264,726, filed on Dec. 1, 2021, provisional application No. 63/141,617, filed on Jan. 26, 2021.

(51) Int. Cl.
*A61G 7/057* (2006.01)
*A61G 7/075* (2006.01)

(52) U.S. Cl.
CPC ....... *A61G 7/05769* (2013.01); *A61G 7/0755* (2013.01); *A61G 2203/34* (2013.01)

(58) Field of Classification Search
CPC ...... A61G 7/047–0755; A61G 2203/00; A61G 2203/30; A61G 2203/34; H04Q 9/00–16; A61B 5/0002–0031
See application file for complete search history.

(56) References Cited

U.S. PATENT DOCUMENTS

| | | | |
|---|---|---|---|
| 3,333,286 | A | 8/1967 | Biolik |
| 4,214,326 | A | 7/1980 | Spann |
| 5,182,828 | A | 2/1993 | Alivizatos |
| 7,240,384 | B2 | 7/2007 | DuDonis |
| 7,637,879 | B2 | 12/2009 | Barak |
| 7,637,922 | B2 | 12/2009 | Johnson |
| 7,637,923 | B2 | 12/2009 | Berish et al. |
| 7,744,551 | B2 | 6/2010 | Pick et al. |
| 8,419,665 | B2 | 4/2013 | Cook |
| 8,754,400 | B2 | 6/2014 | Dalton |
| 8,984,681 | B2 | 3/2015 | Ponsi |

(Continued)

*Primary Examiner* — Michelle J Lee

(74) *Attorney, Agent, or Firm* — Maginot, Moore & Beck LLP

(57) ABSTRACT

A patient compliance monitoring system is provided for monitoring patient compliance in the use of a plurality of patient care and recovery devices in the hospital room. Sensors are associated with each of the devices to detect a usage history of the associated device and to generate usage data therefore. One device is a patient positioning device including a wedge-shaped body with at least one pressure sensor associated with the bottom surface. The wedge-shaped body is formed of a compressible viscoelastic open-cell foam composition that is adapted to compress under the weight so that the angle of the ramp surface of the wedge decreases from an initial ramp angle to a tilt angle for supporting the patient.

5 Claims, 11 Drawing Sheets

(56) References Cited

U.S. PATENT DOCUMENTS

| | | | | |
|---|---|---|---|---|
| 9,421,142 | B2 | 8/2016 | Malhi et al. | |
| 9,693,920 | B2 | 7/2017 | Fowler et al. | |
| 9,717,642 | B2 | 8/2017 | Deshpande | |
| 9,737,454 | B2 | 8/2017 | Hornbach et al. | |
| 9,782,323 | B2 | 10/2017 | Perry et al. | |
| 9,820,902 | B2 | 11/2017 | Ponsi et al. | |
| 10,226,211 | B2 | 3/2019 | Barak | |
| 10,226,551 | B2 | 3/2019 | Richey et al. | |
| 10,292,895 | B2 | 5/2019 | Drey et al. | |
| 10,485,732 | B2 | 11/2019 | Hart | |
| 10,943,678 | B2 | 3/2021 | Hornbach et al. | |
| 10,959,668 | B2 | 3/2021 | Barak | |
| 10,980,702 | B2 | 4/2021 | Moore | |
| 11,744,768 | B2 | 9/2023 | Moore | |
| 2007/0204691 | A1* | 9/2007 | Bogner | A61B 5/6892 73/432.1 |
| 2008/0039759 | A1* | 2/2008 | Holm | A61F 13/0226 602/41 |
| 2011/0178375 | A1* | 7/2011 | Forster | A61B 5/445 600/301 |
| 2013/0274629 | A1* | 10/2013 | Duesterhoft | H04Q 9/00 600/573 |
| 2022/0125667 | A1 | 4/2022 | Nordeen et al. | |

* cited by examiner

PATIENT COMPLIANCE MONITORING SYSTEM

PRIORITY CLAIM

This application is a utility filing from and claims priority to U.S. provisional application No. 63/264,726, filed on Dec. 1, 2021, and to U.S. provisional application No. 63/141,617, filed on Jan. 26, 2021, both titled "Patient Compliance Monitoring System". The disclosures of both provisional applications are incorporated herein by reference.

BACKGROUND

Patients in medical facilities are often under continuous monitoring of vital signs, such as heart rate, blood oxygenation levels, and respiratory rate. For patients experiencing an extended stay in a medical facility, such as a hospital, the monitoring extends to prevent the onset of deep vein thrombosis, pneumonia, and pressure injuries. In each case, patient movement can be critical to stave off these negative consequences of spending significant time in a hospital bed. For ambulatory patients, time spent seated and walking is critical, especially to avoid deep vein thrombosis. For non-ambulatory patients, and even to walking patients to some degree, ensuring that the patient does not remain in any particular position in the hospital bed can be critical to preventing pneumonia and pressure injuries.

The sacrum and the heel are the first and second problem areas, respectively, for hospital acquired pressure injuries. Intervention by medical personnel is often necessary to re-position the patient especially for patients in the ICU that rely solely on the caregiver's repositioning to prevent these pressure injuries. Traditional standard of care involves utilizing multiple pillows to redistribute pressure on the sacrum and heels; however hospitals continue to adopt more reliable ways to safely and effectively offload, rather than redistribute pressure, on these areas in order to prevent pressure injury. Offloading pressure has been shown to be one of the most effective ways at preventing pressure injuries. Products such as wedges and heel protectors are becoming more commonly used to maintain the patient in a particular orientation and position for a limited time, so that pressure injuries do not have time to form on the patient's body. Standard guidelines recommend changing the patient position, or turning the patient, every two hours throughout the duration of the patient's stay in an effort to offload the patient's sacral area. These guidelines also recommend that the patient be inclined on his/her side at an angle of thirty degrees to achieve the proper sideline position for offloading the sacrum. It is also recommended to offload the patient's heels throughout the day for all patients that are bed-bound.

One difficulty experienced in the patient turning protocol is that the patient may shift position or the pillows and wedges may bottom-out causing pressure to return to the patient, unbeknownst to the responsible medical personnel. Another difficulty is in maintaining the two-hour schedule, as medical personnel get involved with emergencies or other critical situations, or as a shift-change occurs. Lastly, total duration of use for the day on wedges and heel protectors is very difficult to measure properly in order to fully assess if at-risk patients are receiving proper pressure injury prevention throughout the day.

In addition to deep vein thrombosis and pressure injuries, bed-bound patients are also at much greater risk for pneumonia due to the decrease lung activity and function. Hospital caregivers encourage the use of incentive spirometry to prevent post-operative pulmonary complications as well as a lung strengthening exercise for bed-bound patients. Additionally, caregivers are instructed to provide oral care to patients every 2-4 hours to eliminate harmful bacteria that are linked to causing ventilator and non-ventilator hospital-acquired pneumonia. Compliance to both incentive spirometry and oral care is critical to pneumonia prevention, yet very difficult to measure in the healthcare setting due to workflow issues, staffing challenges, and documentation inaccuracies.

SUMMARY OF THE DISCLOSURE

A patient positioning device is provided for supporting a patient at a tilt angle relative to a support surface. In one aspect of the disclosure the device comprises a wedge-shaped body having a bottom surface for contact with the support surface and a ramp surface oriented at an angle relative to the bottom surface, in which the ramp surface is configured to be contacted by the patient to support the patient at the tilt angle. The wedge includes at least one pressure sensor associated with the wedge-shaped body at the bottom surface, the pressure sensor configured to generate a signal in response to a pressure, force or load between the support surface and the wedge-shaped body caused by the weight of the patient bearing against the ramp surface. The sensor includes a transmitter for transmitting the signal to a receiver independent of the patient positioning device, which can be a self-powered transmitter or an RFID tag.

In another aspect, a patient positioning device comprises a wedge-shaped body that is formed of a compressible viscoelastic open-cell foam composition. The foam composition is adapted to compress under the weight so that the angle of the ramp surface relative to the bottom surface decreases from the ramp angle to a tilt angle for supporting the patient.

In a further aspect of the disclosure, a patient compliance monitoring system is provided for monitoring patient compliance in a hospital room. The system comprises a plurality of patient care and recovery devices in the hospital room to be used by the patient. A sensor is associated with each of the plurality of patient care and recovery devices that is configured to detect a usage history of the associated device and to generate usage data therefore. Each sensor includes a transmitter, such as a self-powered transmitter or an RFID tag, operable to transmit the usage data of the corresponding sensor. A local station associated with the hospital room is configured to receive the usage data from each sensor and to transmit the usage data for the patient for remote storage and access outside the patient's room.

DETAILED DESCRIPTION

Figure 1:
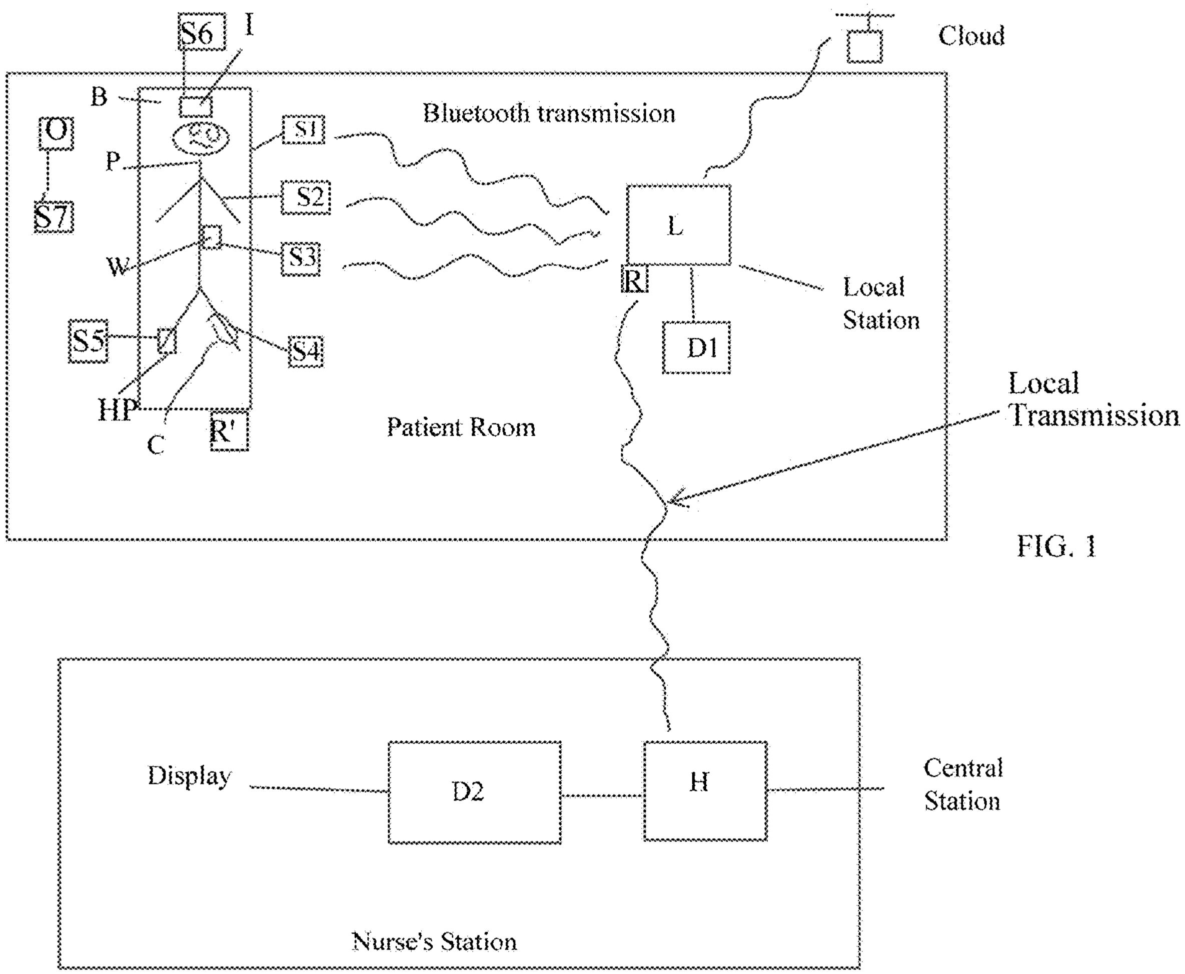
FIG. 1 is a schematic of a patient compliance monitoring system of the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 2:
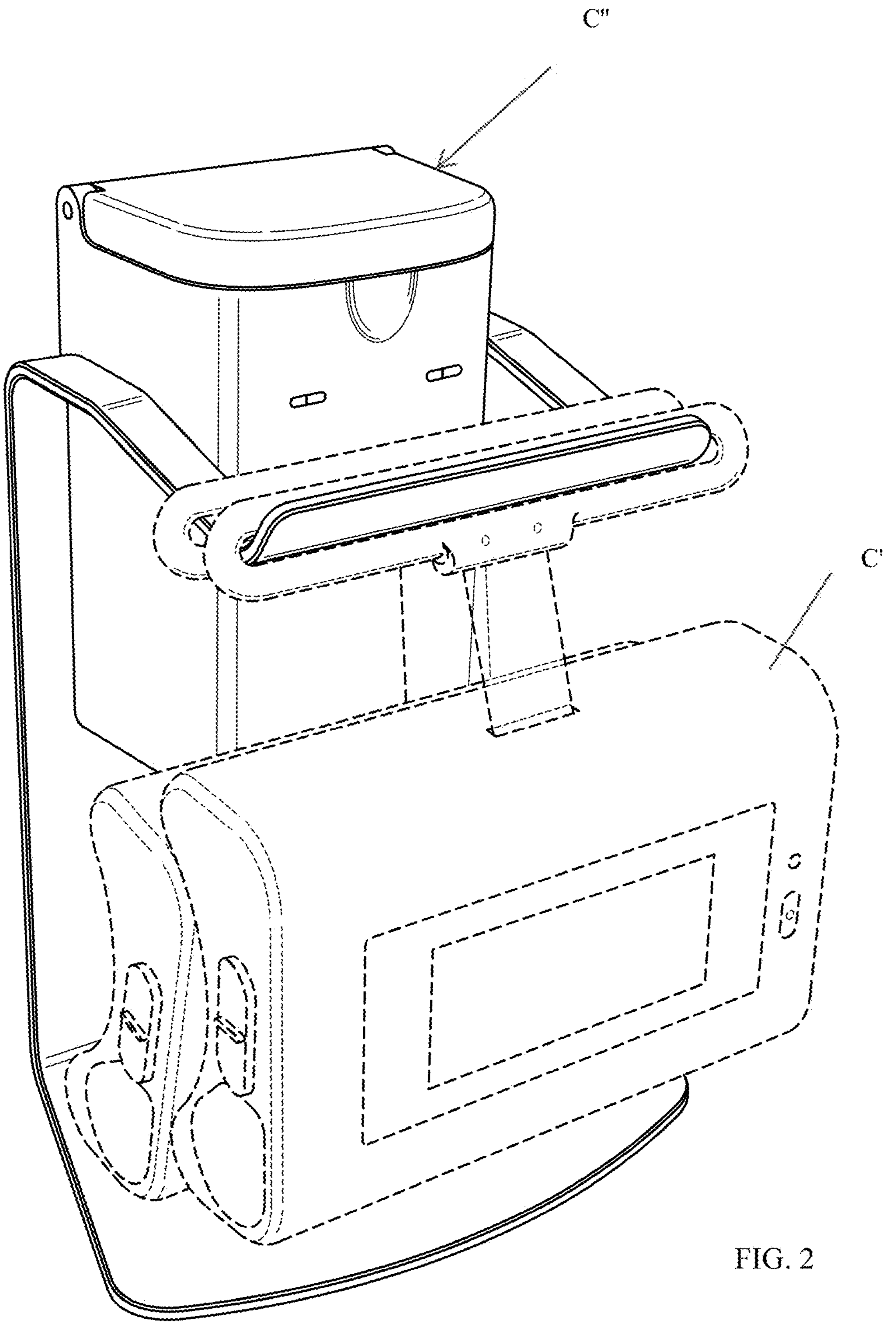
FIG. 2 is a perspective view of a docking station for controllers for use with a compression device monitored by the system shown in FIG. 1.

FIG. 1 is a schematic of a patient compliance monitoring system of the present disclosure. The patient P is on a hospital bed B within a hospital room. The patient is provided with a plurality of patient care and recovery devices that, if properly and consistently used, can facilitate the patient's recovery from a prior medical procedure or event. In the example, the patient is wearing a compression device C on a limb that is operable to prevent deep vein thrombosis. One embodiment of such a device is disclosed in pending U.S. application Ser. No. 16/740,615 (the '615 Application), filed on Jan. 13, 2020, the entire disclosure of which is incorporated herein by reference. As disclosed in the '615 Application, the compression device C includes a controller C', such as the controller shown in FIG. 2. A number of controllers C' can be supported on a docking station C" associated with each patient's room, allowing quick replacement of a controller when the battery power of one compression device has drained.

The patient may also receive oral care cleansings O to prevent bacteria build-up in the mouth, which presents a risk factor for pneumonia. Additionally, the patient may be asked to use an incentive spirometer I to strengthen lung and pulmonary function in the aid of prevention of pneumonia. The patient may also be supported by a wedge W and a heel protector HP to prevent the formation of a pressure injury. The vital signs of the patient are also being monitored by conventional devices. In one feature of the present disclosure, all of the devices and monitors associated with the patient are connected to sensors. Thus, the bed B may have a position sensor S1, the monitor(s) for the patient's vital signs are connected to a sensor(s) S2, the positioning wedge W is provided with a pressure sensor S3 capable or sensing pressure, load or force, the compression device C includes a sensor S4 capable of detecting operation of the device, the heel protector HP includes a sensor S5 capable of detecting usage of the protector, the incentive spirometer I is provided with a flow sensor S6 and the oral care device C can incorporate a usage sensor S7. The sensors electronically read values associated with the particular device or monitor, and then transmit these values wirelessly to a local station L within the patient's room R. The sensors may be integrated into the particular items or may be separate from the item and configured to be removably connected to generate appropriate data regarding the usage of the particular item.

Figure 11:
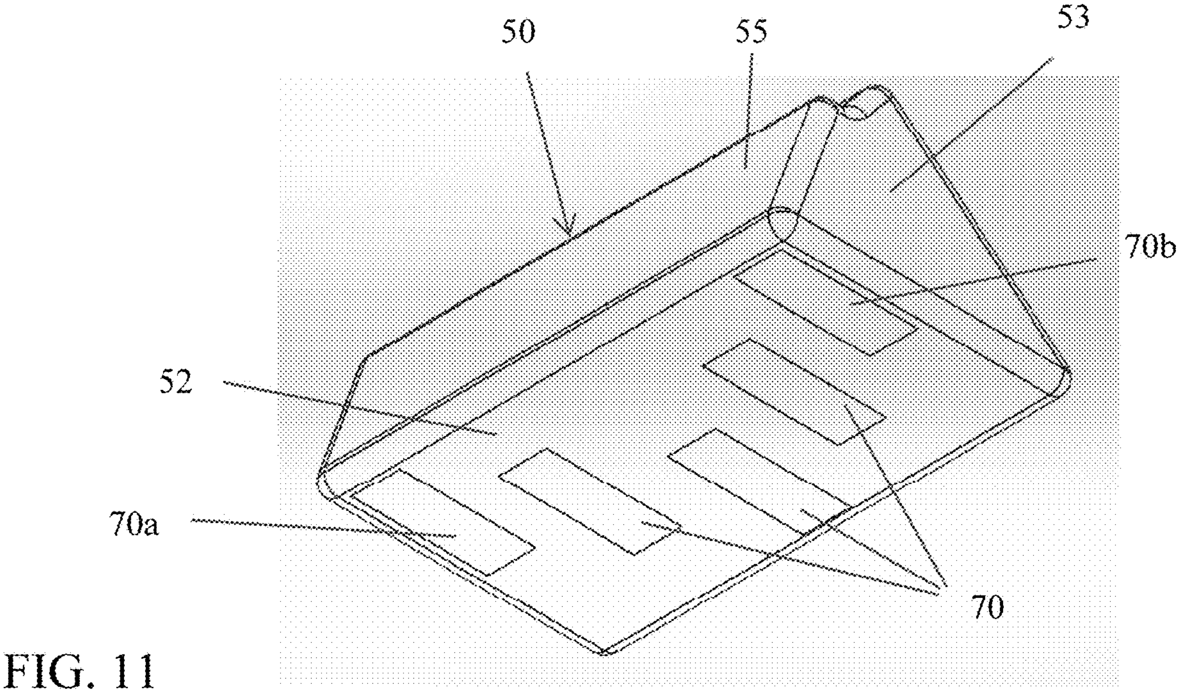
FIGS. 11-12 are bottom perspective views of the positioning wedge of FIGS. 9-10, with sensor arrangements incorporated within the wedge.

In one embodiment, the sensor S4 for the compression device C may be integrated in the compression device C. The '615 Application discloses a DVT compression device that includes control circuitry that implements software commands for controlling the amount and timing of compression of a patient's limb by the device. The control circuitry also includes sensors for determining the number of pressure cycles of the device, the patient's position, the number of steps taken by the patient, and length of time in the patient has spent bed-bound, upright and walking. The control circuitry implements software for accumulating and storing data received from the on-board sensors. The control circuitry incorporates a wireless transmitter/receiver, such as an antenna enabled with Bluetooth® wireless technology or low energy Bluetooth® wireless technology (BLE-enabled). Thus, in one feature of the present disclosure, the control circuitry of the compression device Cis further configured to transmit the sensor data to the local station L, including adopting security features, such as encryption, to protect the data. The local station can include a display D1 that can display the sensor data as it is received. The local station can also include a memory for storing the sensor data from the sensor S4 of the compression device C. The local station L can be provided with a user-interface that allows medical personnel to select information to be displayed on the display D1. One example of the information that can be displayed is shown in FIG. 11 or in FIG. 16 of the '615 Application, which is incorporated herein by reference. The information displayed at the local station L is nominally information sufficient to show patient compliance to the DVT compression and mobility protocol established for the patient.

Each of the other sensors S1-S3, S5-S7 can be configured to generate data based on the operation and usage of the associated component B, P, W, H, I and O. Thus, for the bed B, the sensor S1 can determine the bed position—supine, angled—and the amount of time spent in each position. Each of the sensors can include a memory for storing the sensor data, and includes a wireless transmitter, such as an antenna enabled with Bluetooth® wireless technology or low energy Bluetooth® wireless technology (BLE-enabled), to transmit sensor data to the local station L. Likewise, the sensor(s) S2 for the vital sign monitor(s) can include a memory and include a wireless transmitter to transmit sensor data to the local station L. The sensors, or preferably the local station L, can include an alarm triggered by sensor data outside a predetermined range.

The sensor S5 is associated with a heel protector HP which, as discussed above, is used to offload the patient's heel to prevent pressure injury and is intended to stay on the patient's heel for entirety of the day with periodic off time acceptable during bathing and skin assessments. The S5 sensor can be configured to measure duration of wear time throughout the day to offer the capability to assess a compliance rate to the desired wear time, such as by using pressure sensors integrated into the heel protector to verify that the device is being worn by the patient.

The sensor S6 is associated with an incentive spirometer I used to strengthen lung function and prevention of post-operative pulmonary complications. The S6 sensor can be configured to measure the frequency of usage and store performance metrics during use in an effort to assess improvement or regression of the patient's lung function over time.

The sensor S7 is associated with an oral care device O used to cleanse the oral cavity of the patient to reduce the risk of ventilator and non-ventilator hospital-acquired pneumonia. The sensor S7 can be configured to identify the type of cleansing and to measure the duration and time of the cleansing in order to help hospital staff know the appropriate timing for the next cleansing based on their hospital protocol.

Figure 3:
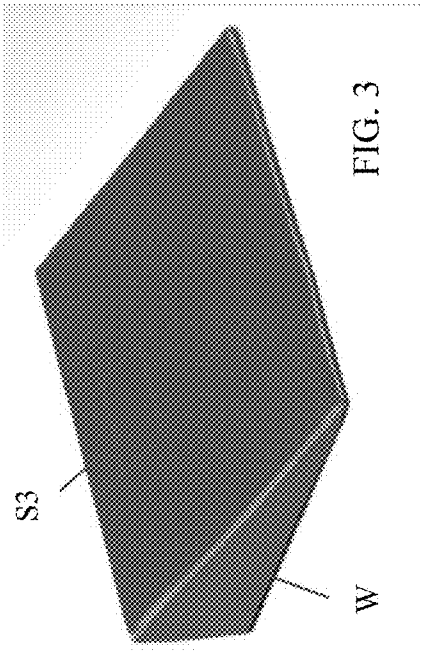
FIG. 3 is a perspective view of a positioning wedge incorporating a sensor in one aspect of the present disclosure

The sensor S3 associated with the wedge W can be a low cost pressure sensor constructed using a thin film force sensitive resistor (FSR) that can be associated with a positioning wedge W, as shown in FIG. 3. As discussed above, the wedge W is used to support the patient on his/her side at a predetermined angle. It has been found that supporting the patient at a thirty-degree (30°) angle helps prevent pressure ulcers form developing. The patient is periodically repositioned (such as every two hours), alternating between lying prone and lying at the 30° angle on either side. As noted above, the patient can sometimes shift position on the wedge, typically sliding down the slope so that only a small part of the patient's body is elevated by the wedge. In addition, the patient sometimes spends too much time at the particular position on the wedge. Thus, in one aspect of the present disclosure, the sensor S3 is separately mountable on an existing wedge W. The sensor can be removably mounted in any manner and configured to be reusable with a different wedge. Alternatively, and preferably, the sensor S3 is a single-use device that can be disposed of with the wedge when the wedge is no longer being used by the particular patient. In this case, the sensor S3 can be permanently fixed to the existing wedge, such as by fixation to the outer surface of the wedge or embedded in the body of the wedge.

The sensor S3 includes a pressure sensor (FSR), or other device capable of detecting pressure, load or force, and control circuitry to collect and store pressure data from the pressure sensor, along with a wireless transmitter to transmit that data to the local station L. The sensor S3 is configured to be fastened to the wedge W at an optimum position to detect that the patient is correctly positioned on the wedge. In that position, the patient's body will generate a pressure on the wedge, and therefore on the sensor S3, that is a known percentage of the weight of the patient (namely cos(30) or 0.866*weight). The sensor S3 can continuously or periodically monitor the pressure, load or force exerted by the patient's body on the wedge and transmit that data in real-time to the local station L for display on the display D1. It is contemplated that either the sensor S3 or preferably the local station L is configured to generate an alarm if the pressure sensed by the sensor S3 falls below a threshold value. The local station can also be configured to display the pressure and usage history which can be evaluated by the medical personnel.

In a further aspect, the wedge W and/or sensor S3 and/or local station L can incorporate visible indicators that can be used to quickly determine whether the wedge has been used with a patient for the optimal period, namely two hours. Thus, on one embodiment, an indicator light that is activated when the optimal period has been exceeded, plural indicator lights are activated at particular time intervals, or other light patterns are illuminated in a manner that can be interpreted by the medical care personnel. The indicator light(s) are positioned to be readily visible to a person looking into the room so that a quick assessment can be made regarding the use of the wedge W. It can be contemplated that the sensor S5 associated with the heel protector HP can be similar to the sensor S3 and can include similar visual indicators regarding the usage of the heel protector as appropriate.

As with the sensor S3, the other sensors can be separate from the component with which the sensor is associated. Thus, the sensor S1 for the bed B can be mounted to the head of the bed and can include an angle detector to ascertain the angle of the head of the bed. The sensor can be temporarily affixed to the bed, such as by double-side tape, so that the sensor S1 can be removed when the patient is discharged from the room. Alternatively, the sensor S1 can be permanently affixed to an existing bed or integrated into a new bed.

The sensor S2 associated with the vital sign monitor(s) can be independent of the vital sign monitor(s) and configured to electronically communicate with the monitor(s) to receive the pertinent data, such as blood pressure or blood oxygen content. Alternatively, the sensor S2 can be integrated into the particular monitor(s).

Figure 4:
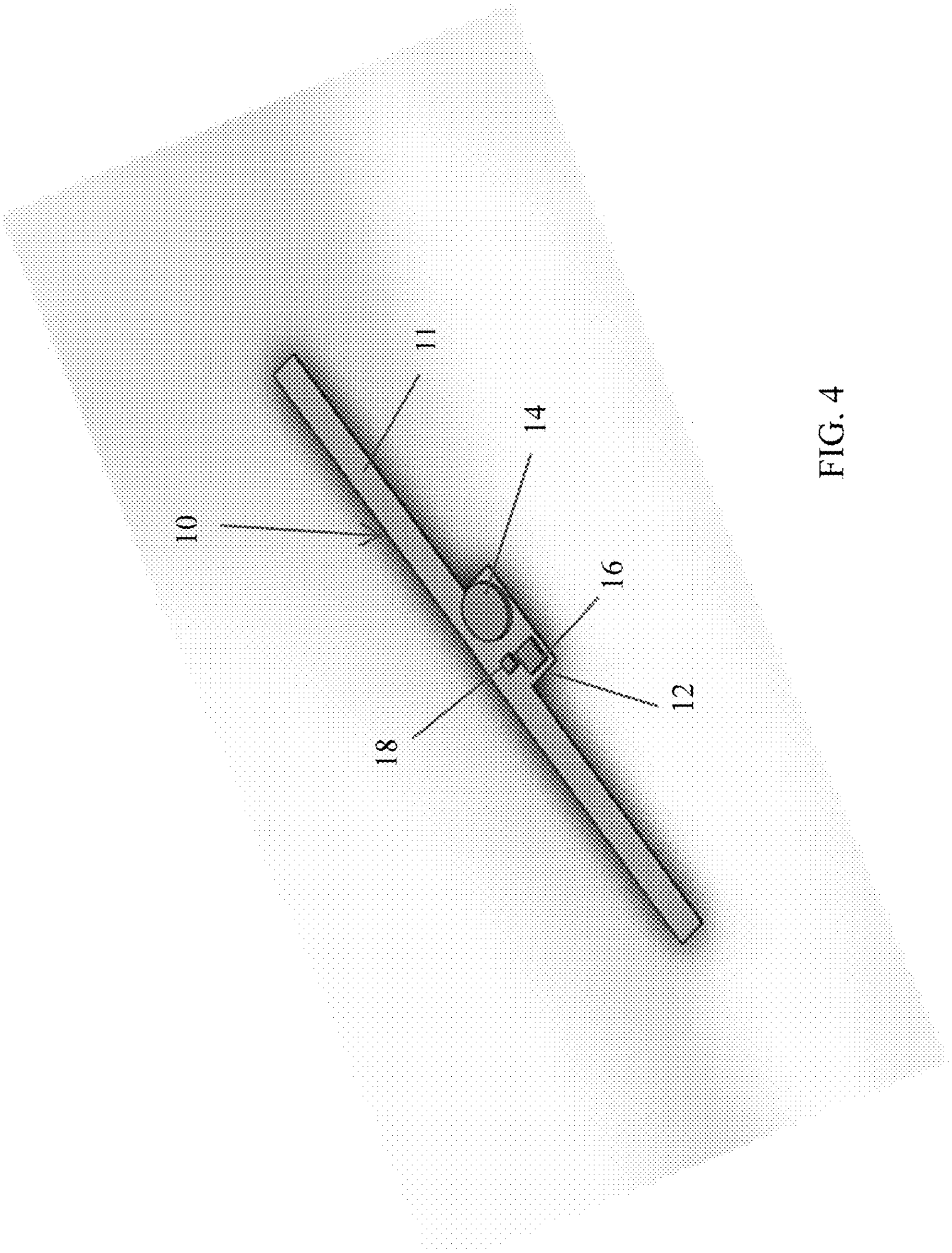
FIG. 4 is a top view of a sensor for use with a positioning wedge such as the wedge of FIG. 3.
Figure 5:
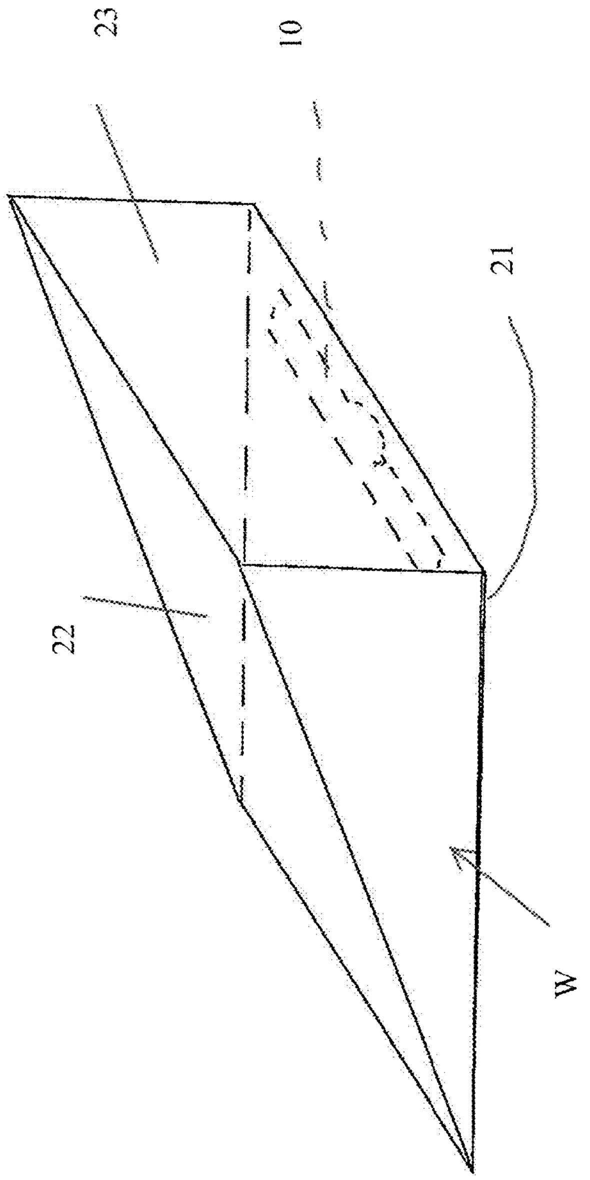
FIG. 5 is perspective view of the sensor of FIG. 4 mounted on a positioning wedge, such as the wedge of FIG. 3.

In one embodiment, the sensor S3 of the wedge W shown in FIG. 3 can be a force or pressure sensor 10 that includes a force sensitive resistor strip 11 coupled to a control circuit 12, as shown in FIG. 4. As is known in the art, the force sensitive resistor strip 11 changes resistance as a function of the force or pressure exerted on the body of the sensor. In the illustrated embodiment, the force sensitive resistor is an elongated strip that has a length slightly less than the width of a positioning wedge, such as the wedge W. For a typical positioning wedge, the width is about 12 in., so the force sensitive resistor 11 can have a length slightly less than or equal to 12 in. As illustrated in FIG. 5, the strip is positioned on the bottom surface 21 of the wedge that rest on the surface of the hospital bed. The patient rests on the upper surface 22 and exerts a force perpendicular to the upper surface, but with a vertical force component bearing on the resistor strip. The pressure sensor 10 is positioned near the back surface 23 of the wedge, vertically beneath the highest part of the wedge W. This position of the pressure sensor ensures that the patient if fully and properly positioned on the wedge to ensure that the patient is resting at the proper angle, such as the 30° angle discussed above.

The force sensitive resistor strip 11 includes an adhesive surface that is adapted to adhere to the material of the wedge W. Conventional positioning wedges have an outer surface of a vinyl or polyurethane material, so the adhesive surface of the resistor strip 11 is adapted to adhere to those materials. Since the wedge and sensor are not reusable, the adhesive can permanently affix the sensor to the wedge. It is contemplated that the sensor includes a removable backing covering the adhesive surface that can be removed when it is desired to affix the sensor to a wedge W. Alternatively, the sensor can be integrated into a cover that is configured to be fitted over a wedge. The cover would ensure that the sensor 10 is properly oriented relative to the wedge for proper pressure readings when the patient is properly positioned against the wedge.

Returning to FIG. 4, the control circuit 12 of the sensor 10 includes a battery 14 that powers the sensor, namely the resistor strip 11, a control chip 16 and a transmitter 18. As discussed above, the transmitter 18 is preferably a transmitter enabled with Bluetooth® wireless technology, and more preferably a BLE-enabled transmitter to reduce the energy requirement for the control circuit. The entire force sensor 10 is intended to be a single-use disposable device so the battery only needs a limited life. It is contemplated that once the sensor 10 is activated it operates continuously until the battery dies or the sensor is destroyed. The sensor can include a pull tab isolating the battery 14 from electrical contact with the remainder of the control circuit. Removing the pull tab brings the battery into electrical contact, automatically providing power to the resistor strip, control chip and transmitter. The battery can be selected for the desired limited life during continuous activation. In most common applications of the positioning wedge W, the patient only needs to use the wedge for a few days, since the recovery protocol is intended to get the patient on his/her feet as quickly as possible. Thus, in the typical case, the battery 14 is selected to have a life of ten days. If the patient requires longer use of a positioning wedge, the hospital protocol is to dispose of the current wedge and obtain a new wedge with a new sensor. According to this protocol, the sensor 10 is removed from the wedge so that the sensor, and its battery and electrical components, can be disposed of properly.

The control chip 16 applies a voltage from the battery to the resistor strip, continuously monitors the resistance of the resistor strip 11 and generates a signal proportional to the force applied to the sensor. The chip may implement a monitoring protocol that simply transmits the signal, leaving interpretation of the signal to a separate device. However, the control chip is preferably configured to implement a power-saving protocol in which a signal or data is only transmitted by the sensor when there is a meaningful change in sensed force or pressure. Thus, the control chip 16 can be configured to transmit a signal only when the sensed resistance changes by a predetermined amount, with the predetermined amount corresponding to the difference between an unloaded wedge and a wedge with a patient positioned on the wedge. Thus, in one embodiment, the transmitted signal can simply be an "unloaded" or "loaded" signal transmitted using the BLE-Notify protocol. Alternatively, the control chip can be configured to discern the force or pressure applied to the wedge to assess whether the patient is properly positioned on the wedge. However, this alternative protocol necessarily increases the power usage of the chip, which leads to a reduced sensor life. In one embodiment, the sensor 10 is only intended to determine whether the wedge is in use in order to determine whether the use of the wedge has exceeded the recommended length of time, such as two hours.

Figure 6:
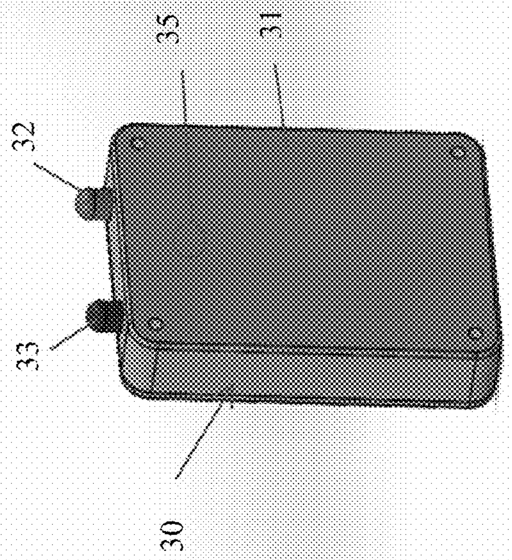
FIG. 6 is a perspective view of an indicator device particularly for use with the sensor of FIGS. 4-5, according to one feature of the present disclosure.

The control chip is also operable to pair the sensor to an indicator device, such as the device 30 shown in FIG. 6. The pairing function can be implemented using the Bluetooth® communication protocol, as is known in the art. Alternatively, and preferably, the pairing function is achieved using the NFC (near-field communication) protocol. The NFC protocol has a much more limited communication range (4 cm) than the communication protocol (30 ft.) for a device enabled with Bluetooth® wireless technology, but a faster connection rate. In one embodiment, the sensor is paired with the indicator device by placing the sensor immediately next to the indicator device. The limited range of the NFC protocol ensures that the sensor 11 does not attempt to pair with any other device enabled with Bluetooth® wireless technology within the typical thirty-foot range of the Bluetooth® wireless technology communication protocol. The control chip is configured to allow the sensor to be paired to multiple devices, albeit not at the same time, which allows the sensor 10 to be moved with the associated wedge when the patient is moved to a different room.

One embodiment of the indicator device 30 is shown in FIG. 6. It is contemplated that the device 30 can be positioned at the entrance to a patient's room, such as by affixing the housing 31 to the wall adjacent the room door. The housing can include an adhesive strip that adheres to the wall, can be mounted using fasteners such as screws, or can be supported in a mounting bracket affixed to the wall. A primary purpose of the indicator device 30 is to provide an immediate indication to attending medical personnel of the status of the particular patient's use of the wedge W. As described above, it is desirable to change a patient's position every two hours, so the indicator device 30 is configured to provide a visual reminder when that two-hour timer limit has been reached.

The indicator device 30 includes two indicator lights—a green light 32 and a red light 33. In general terms, the green light 32 is illuminated when a sensor 10 is wedge is in proper use, and the red light 33 is illuminated when the wedge is not in use or is not properly used. In particular, the indicator device includes an antenna to receive the signal from the sensor 10 device enabled with Bluetooth® wireless technology and a control circuit or chip that pairs the indicator device to the sensor, receives and evaluates the signal received from the sensor, and activates the two lights accordingly. Thus, in one embodiment, the control chip is configured to activate the red light 33 when a sensor is paired to the indicator device. If the sensor is not in use—i.e., the resistor strip 11 is not being loaded and the sensor is sending an "unloaded" signal—the red light blinks. When the sensor is loaded it sends a "loaded" signal, and if the "loaded" signal is detected by the indicator device for a predetermined period, such as 30 seconds, the device 30 deactivates the red light 32. However, if the "unloaded" signal is thereafter received, the control chip continuously illuminates the red light 33 as an indication to the medical personnel that something is amiss with the wedge W, such as the patient has slipped off the wedge or is not fully bearing against the wedge.

When the control chip has received the "loaded" signal for the predetermined period and the red light 33 is deactivated, the control chip continuously activates the green light 32. This indicates to the medical personnel that the patient is properly positioned on the wedge W and the wedge is being used correctly. Once the green light is activated, the control chip activates a timer that measures the length of time that the wedge is under pressure. When the length of use reaches the time limit—two hours, as discussed above—the control chip causes the green light 32 to blink, indicating to the medical personnel that it is time to reposition the patient. As the patient and wedge are being repositioned, the sensor sends an "unloaded" signal to the indicator device, and the control chip of the device 30 resets the time, to be restarted when a "loaded" signal is received by the device.

The control chip is configured to permit two sensors to be paired with the indicator device. A patient is typically provided with two wedges W, with one located at the upper back and the other at the waist. Both wedges are provided with a sensor and both are paired with the indicator device 30 prior to usage of the wedges. The control chip is configured to discern data from the two sensors 10 and to determine whether a "loaded" signal is received from each sensor. In one embodiment, a single pair of indicator lights 32, 33 are related to the two wedges/sensors, so that both sensors must be properly engaged before the green indicator 32 is illuminated. If any one of the sensors sends an "unloaded" signal, the control chip of the indicator device activates the red indicator light 33, as described above. The red light is only deactivated when both sensors have sent a "loaded" signal for the predetermined time period. The indicator device can include a disconnect button 35 that can be depressed by the medical personnel to automatically disconnect the device from any sensors paired to the device.

The indicator device 30 is preferably battery powered, and most preferably with a rechargeable battery. The device can include an on-off switch to activate the device or the device can be fully activated when an activated sensor is placed near the indicator device. Once the indicator device is paired with a sensor or pair of sensors it remains activated. The on-board control chip can be configured to issue a warning when the battery life is not sufficient for the device to remain active for the two-hour period necessary to determine whether the patient needs to be repositioned. The warning can be a simultaneous blinking of both indicator lights 32, 33 or some other visual indicator. Since the indicator device is not specific to any patient or hospital room, the device can be removed from any particular room to be recharged at a remote location. The device can be replaced with a fully-charged indicator device that is paired with the wedge sensors before being installed at the door of the patient's room. An outer surface of the housing 31 can include solar cells or indoor solar cells to assist in powering the indicator device or recharging the on-board battery.

The present disclosure provides a system for monitoring the usage of patient positioning wedges to ensure that a patient is not left in a particular position for too long. A hospital facility can include an indicator device associated with every patient room with a plurality of replacement devices to replace an activated device that is losing power. When a patient is to be provided with a wedge or wedges W, a sensor 10 is affixed to each wedge and the sensor is activated. The outfitted wedges are placed near the indicator device 30 for automatically pairing the sensors. Alternatively, the sensors can be paired before being affixed to the associated wedge. Once activated the sensors begin transmitting an "unloaded" signal since no pressure has been applied to the resistor strip of the sensors. Once the sensors are paired to the indicator device 30, the indicator device illuminates the red indicator light 33 to blink, indicating that the sensor has been paired but the wedge is not in use.

The wedge is then positioned to support the patient in a customary manner, ensuring that the patient's body is fully engaged on the upper surface 22 of the wedge (FIG. 5). Once the patient is resting on the wedge the patient's weight generates a force on the resistor strip 11 of the sensor, resulting in a change of resistance of the strip that is sensed by the control chip 12 of the sensor 10. The sensor automatically transmits a "loaded" signal which is detected by the indicator device. The green indicator light 32 is illuminated and the red light deactivated after the "loaded" signal has been detected for a predetermined time period. When two wedges are being used, both sensors must transmit the "loaded" signal before the green indicator light is illuminated. In the ordinary course, nothing further occurs unless and until the pressure on the wedge and sensor is reduced or the usage time (two hours) has been exceeded. In the former case, the green indicator light is deactivated and the red indicator light is fully activated. In the latter case, the green light begins blinking to inform the medical personnel that a patient repositioning is required. When the patient no longer requires the positioning wedge(s), the sensors can be removed and disposed of in a proper manner.

It can be appreciated that the sensor 10 and indicator device 30 disclosed herein is especially suited for use with a positioning wedge. However, the two components can be used in other situations where a patient-induced load requires monitoring. For instance, a recovery boot can be instrumented with a sensor(s) and used to verify that the patient is wearing the boot. In that case, the indicator device can include features to measure the length of time that the boot is being worn as well as identify different activities based on the magnitude of the pressure exerted by the patient. The resistor strip can be appropriately sized to fit the recovery boot.

It can be appreciated that the indicator device 30 can be integrated into the local station L (FIG. 1) that includes control circuitry and a wireless transmitter/receiver to receive data from the various sensors S1-S2, S4-S7 in the patient's room R. It is contemplated that different sensors or more sensors can be associated with a given patient P. The control circuitry of the local station L is configured to pair with any sensor introduced into the room R, which can occur automatically when the sensor moves within range of the station. Alternatively, and preferably, the pairing requires intervention of the medical personnel via a user-interface of the local station. Optimally, the user-interface is a GUI, such as a touch screen display for the display D1. In one aspect of the pairing operation, the paired sensors are associated with a particular patient and data generated by those sensors are assigned to that patient in the system. In some cases, multiple patients may share a room, meaning that multiple patients will share the same local station L. Providing a unique identifier for each patient ensures that the right sensor data is associated with the right patient.

Returning to FIG. 1, the pairing function of the local station L can use a pairing protocol, such as the Near Field Communication (NFC) pairing, to verify the authenticity of the sensors S1-S7, to verify that the particular sensors are appropriate for the particular patient and/or to activate relevant functions of the local station to accept the data from the particular sensor. The technology used in NFC is based on older RFID (Radio-frequency identification) ideas, which used electromagnetic induction in order to transmit information. The MAC address for each transmitter/receiver that is part of each sensor is transmitted to the local station L which is then used to connect to the sensor.

The local station can be configured to adjust the information displayed on display D1 based on the monitors and devices in the patient room. The display can be divided into segments associated with a particular sensor, or can scroll through displays associated with each sensor.

In one feature of the present system, the local station L is configured to transmit the sensor data to the "Cloud" for remote storage of the sensor data. Thus, the local station L can include an internet connection capability along with software that uploads the sensor data. This upload can occur automatically as data is accumulated or at predetermined times, or can be initiated by the medical personnel. Storage of the sensor data in the Cloud allows for remote access of the data, such as by the patient's attending physician who can evaluate the patient's activity and recovery via the hospital electronic medical records. It is contemplated that the indicator device 30 can communicate with the local station and that information regarding usage of the positioning wedge can be uploaded to the "Cloud", transmitted to the central hub H or transmitted to a remote caregiver.

In another feature of the present system, the local station L is configured to transmit the sensor data to a central hub H associated with the medical facility, such as at the nurse's station of a specific ward of the facility. The central hub includes its own display D2 that can be configured for a wide range of information displays. The central hub H receives data from the local stations L of all of the patient rooms R affiliated with the particular nurse's station. The local stations L and central hub H preferably communicate wirelessly, such as over a secure cellular network or a local WiFi network within the medical facility. The local stations and central hubs can implement a pairing and handshake protocol when a local station is activated in a particular room. Each local station L is provided with a unique identifier, such as the room number in which the local station resides. This unique identifier can be carried over to information displays on the display D2 of the central hub H.

Figure 7:
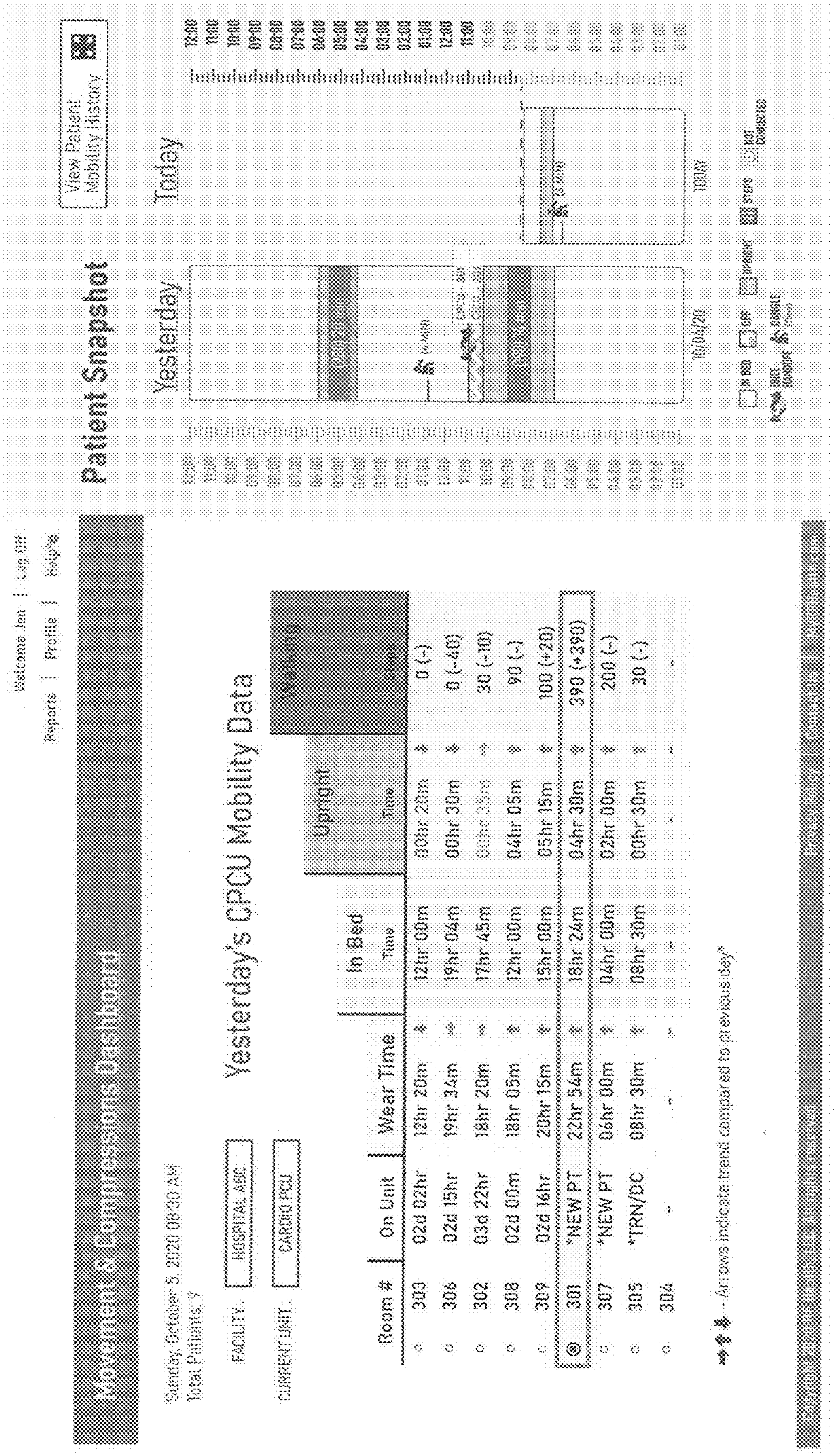
FIG. 7 is a screen shot of a display showing information received from the local stations in the network of the system shown in FIG. 1.
Figure 8:
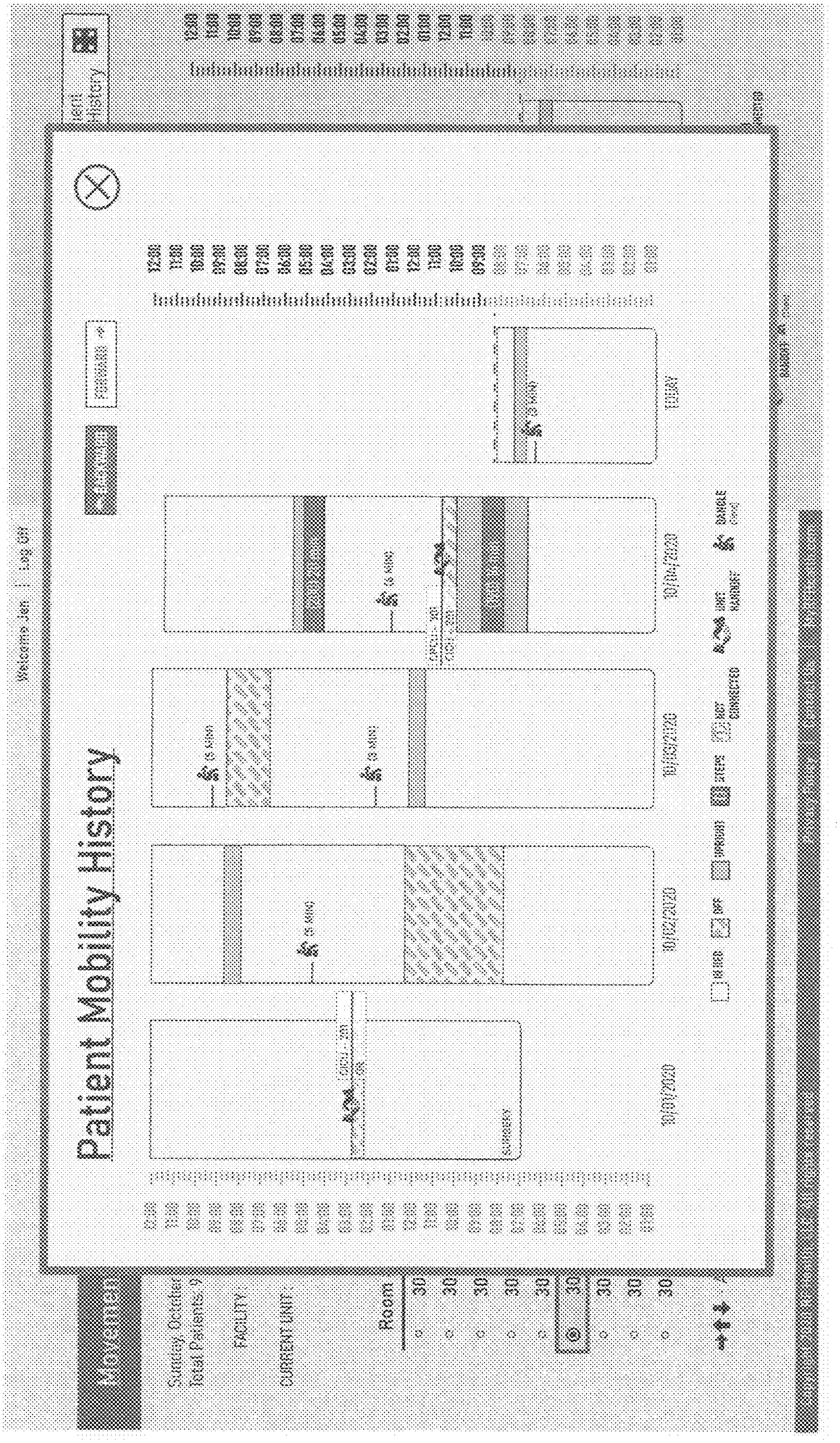
FIG. 8 is a screen shot of a display showing patient mobility history for a particular patient being monitored by the monitoring system shown in FIG. 1.

Thus, as shown in FIG. 7, the display can include a summary of information from all of the local stations in the network, namely data from the sensor S4 associated with the DVT compression device C for each patient. The display D2 of the central hub can incorporate a graphic-user interface that allows the medical personnel to highlight a specific patient and display a "Patient Snapshot", as shown in the right side of the display in FIG. 7 The user-interface can also allow the medical personnel to bring up a more detailed display for a particular patient, as shown in FIG. 8. The information displayed in FIGS. 7-8 can be indicative of the patient's level of activity, and thus indicative of the patient's level of compliance with a recovery regimen. Thus, the amount of time spent in bed, upright and walking are summarized in the displays to provide a caregiver an immediate picture of the patient's recovery efforts. The displays shown in FIGS. 7-8 are specific to the DVT compression protocol for the patient, but it is understood that similar summary and detailed displays can be provided for all of the other connected devices in the patient's room, such as the sensor S3 for the wedge W, vital sign monitor(s) S2 and the sensor S1 for the bed B.

The central hub can implement software to evaluate the patient-specific data as it is received from each local station L, including the indicator device 30. The central hub H can be further configured to generate alarms when the sensor data falls outside pre-determined thresholds. For instance, if the data from sensor S3 or indicator device 30 indicates that the patient has been in one position for over two hours, an alarm specific to the particular patient P or patient room R can be generated by the central hub. Any of the other sensors can trigger an alarm with appropriate monitoring software within the central hub. Even in non-emergency situations, the central hub can be configured to draw the attention of medical personnel to certain data on the display D2, such as by highlighting an entry for a particular patient.

It is contemplated that the central hub H can collect all of the patient-specific data from the several local stations L and send that data for storage in the Cloud, in lieu of that function being performed by each local station. In either case, whether transmitted by the local or the central hub, the sensor data can be accessed remotely by other medical personnel. This access can be by desktop or laptop computer, by tablet or by smart-phone. This feature allows the patient's doctor or an attending physician, for instance, to continuously monitor the patient care and the patient's progress in recovering from a surgery, for instance. The sensor data stored by the local or central hubs of the present system can be password protected or stored in a manner to restrict access to authorized medical personnel. The stored data can also be desirably accessed by management of the particular healthcare facility to assess overall performance of the facility in patient care or compare the performance to certain metrics.

As described above, a wide range of patient-care components can be associated with a sensor and data transmission component. The sensor can be separate from each of the patient-care components but connectable or attachable to the existing patient-care component. Each sensor is configured to generate and/or receive data related to the function and performance of the particular patient care component. The data accumulated from the patient-care components can provide a complete picture of the patient's care and recovery for the duration of his/her stay in the healthcare facility. Each patient room includes a local station L that receives and stores the data from all of the sensors associated with a particular patient. That sensor data is made available within the healthcare facility at a central hub H and essentially worldwide by uploading to the Cloud. The local stations and central hub can include software that can analyze the data to determine if a condition exists that requires immediate attention by medical personnel. The local stations and central hub can include displays D1, D2 that allow medical personnel to display the sensor data in a meaningful format that allows the personnel to track the patient's treatment and response to treatment.

Figure 9:
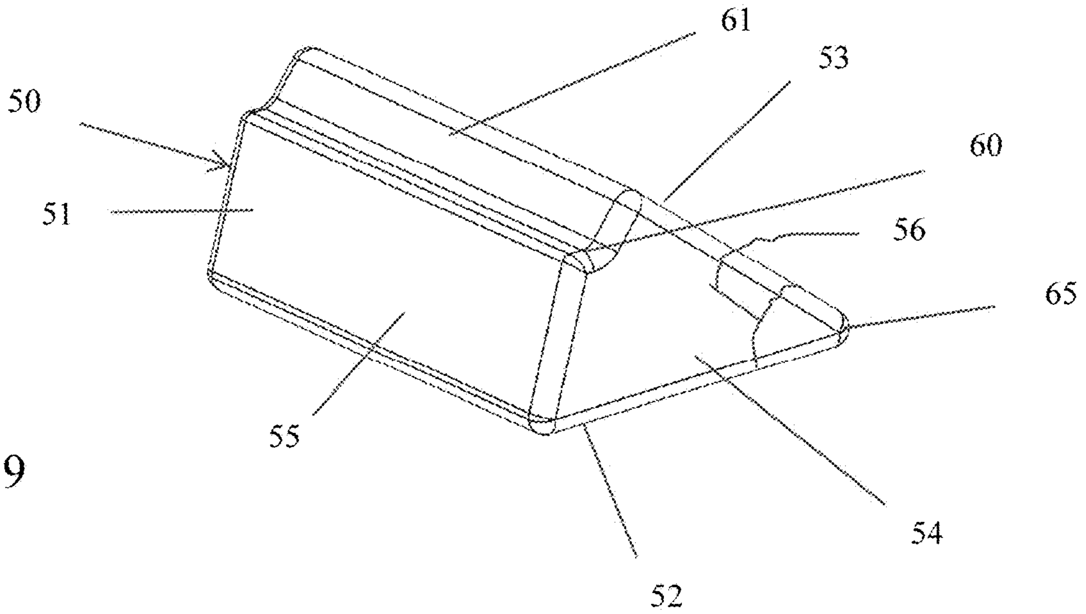
FIGS. 9-10 are top perspective views of a positioning wedge according to another embodiment of the present disclosure.
Figure 10:
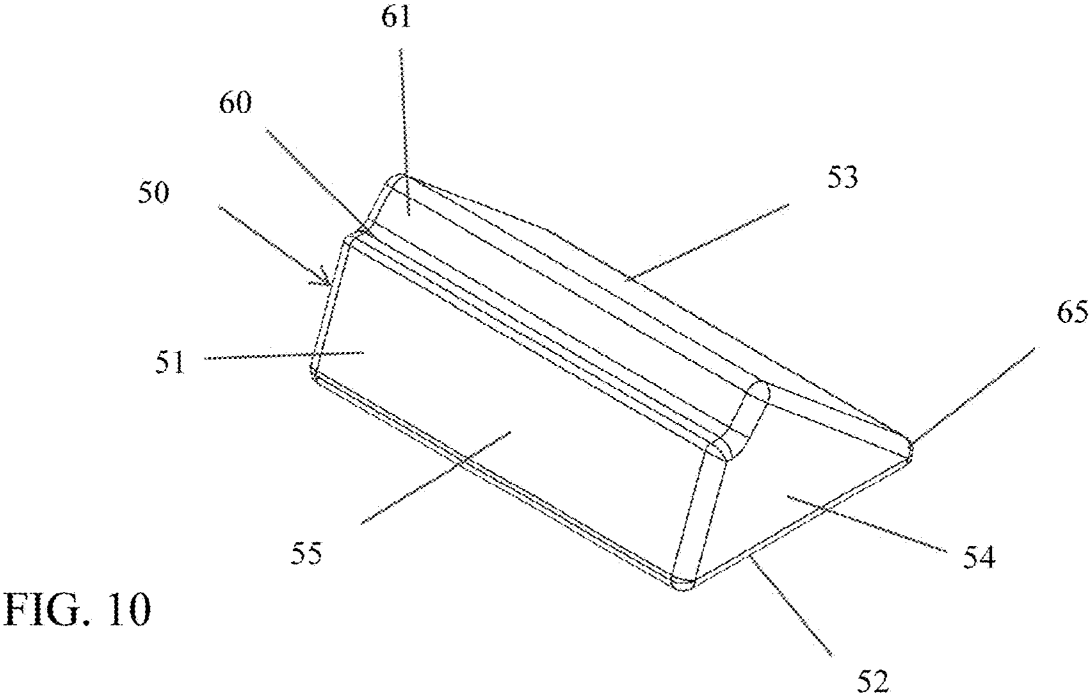

In another embodiment of the present disclosure, a positioning wedge 50 shown in FIGS. 9-10 comprises a wedge-shaped body 51 that includes a bottom surface 52 that contacts the bed surface, a front or ramp surface 53 against which the patient rests, opposite side surfaces 54 and a back surface 55. The back surface 55 can be perpendicular to the bottom surface 52, but is preferably at a non-perpendicular angle in the range of 60-70°. The wedge can be of conventional dimensions, such as 7-10 ins. high, 24-30 ins. long and 6-8 ins. wide. The conventional positioning wedge has a ramp surface defined at a 30° angle relative to the bottom surface, because the industry standard for positioning a patient on his/her side is a tilt angle of 30°. The conventional wedges are formed of a generally rigid material so the 30° tilt angle of the ramp surface will generally be maintained even under the weight of a patient. In contrast, the ramp surface 53 defines a ramp angle 56 of about 40° relative to the bottom surface 52. In a further feature, the wedge 50 is formed of a moldable viscoelastic open-cell foam composition that can be deformed under the weight of the patient. In particular, the wedge is configured to deform under the weight of the patient so that the angle of the ramp surface decreases from the ramp angle to a lower tilt angle, preferably until the ramp surface is at the industry standard 30° tilt angle. The compressible wedge 50 is more comfortable to the patient than the generally rigid conventional wedges. Moreover, the compressible wedge can conform to the patient's contour instead of the flat surface of the conventional wedge.

The compressibility of the viscoelastic foam composition of the wedge 50 provides a further benefit to the nurse or medical personnel. In particular, the wedge can be grasped and compressed by the nurse when it is necessary to move or reposition the wedge. It is often necessary to reposition a wedge that has slipped or has become uncomfortable to the patient. During this process it is necessary to support the patient to remove the patient's weight from the wedge, and then reposition the wedge. The conventional rigid wedge is difficult to grasp and manipulate with one hand while supporting the patient with the other hand. The viscoelastic foam composition of the wedge 50 allows the nurse to grasp and squeeze a corner of the wedge to easily move the wedge as needed.

Another problem with conventional wedges is that the weight of the patient gradually pushes the wedge out from under the patient. When a patient is resting against a positioning wedge, the patient's weight generates a force vector perpendicular to the ramp surface, such as surface 53. The angle of that force vector is complementary to the tilt angle of the wedge (i.e., 90°—the tilt angle, or 60° for a conventional tilt angle). This weight force vector has a vertical component that tends to push the wedge into the bed, and provides the normal force for generation of the friction force between the wedge and the bed surface. The weight force vector also has a horizontal component that tends to push the wedge out from under the patient. With the patient inclined at a 30° angle, the horizontal component of the weight force vector is 50% of the patient's weight (cos(60)). Over time, this horizontal component of the weight vector overcomes the static friction between the conventional wedge and the surface of the bed.

Thus, in another feature, the viscoelastic open-cell foam composition of the wedge 50 provides a “tackiness” that is much greater than the conventional positioning wedge. This tackiness manifests in an increased resistance to slippage of the wedge on the bed surface. This tackiness is provided by the self-skinning property of the open-cell foam composition in which a “skin” is formed on the surface of the composition when it is molded. It can be appreciated that this skin also facilitates cleaning the wedge after use.

The viscoelastic foam composition that provides the compressibility and tackiness described above is the ELASTOFLEX®28625R/ELASTOFLEX®8350T foam manufactured by BASF Corporation of Wyandotte, Michigan. The ELASTOFLEX®28625R component is a resin that includes polyether polyols with additives, while the ELASTOFLEX®8350T component is an MDI-based isocyanate (methylene diphenyl diisocyanate). The components are mixed to achieve an isocyanate index of 76-84, and preferably 78, to achieve the properties described above. Thus the components are mixed in a weight ratio of resin to isocyanate of between 100:49.8 and 100:55.0, and preferably 100:51.1. The density after molding is in the range 3.5 to 7 lbs/ft$^3$. As discussed above, this viscoelastic foam composition allows the wedge angle 56 to be reduced to a suitable tilt angle, such as the industry standard 30° tilt angle. The weight ratio range of the components can adjust the compressibility of the wedge to achieve a reduction in angle of 25-30% from the initial angle 56. In the illustrated embodiment, the initial angle is 40° and the wedge is compressible to an angle of 30°; however, other angles are contemplated as desired for a particular application of the wedge.

As discussed above, the compressibility of the wedge 50 allows medical personnel to grasp and squeeze the wedge as needed to reposition it. In order to facilitate grasping the wedge, the wedge 50 can be provided with an upper ledge 60 with a wall 61 that integrates with the ramp surface 53. The ledge 60 provides an indented surface that can be engaged by the nurse's fingers with the thumb engaging the bottom surface 52 as needed. The nurse can then compress the foam composition at the ledge 60 to obtain a firm one-handed grip on the wedge to easily move the wedge, even under slight pressure from the patient's weight on the ramp surface 53. In one specific embodiment, the ledge 60 can extend a depth of 2-3 ins. toward the wall 61. The ledge 60 in the illustrated embodiment is between the ramp surface 53 and the back surface 55. However, the ledge can be integrated at any edge of the wedge 50, such as between the back wall 55 and either or both side wall 54.

In another feature of the wedge 50, the leading edge 65 between the bottom surface 52 and the ramp surface 53 is formed as a bull-nose. The radius of the bull-nose can be 0.25-1.0 ins. and preferably 0.5 inches in the illustrated embodiment The conventional positioning wedge is essentially triangular, with a slight transition between the bottom and ramp surfaces. This aspect of the conventional wedge causes the leading edge to be susceptible to bending or buckle when the wedge is positioned beneath a patient. This can make the wedge uncomfortable for the patient and can make the wedge more susceptible to dislodgement during use. The bull-nose leading edge 65 of the wedge 50 allows the wedge to be introduced underneath the patient without risk of bending or buckling of the leading edge. The bull-nose configuration also allows the wedge to act as a lever as the wedge is introduced beneath the patient. It can be appreciated that the compressibility of the viscoelastic foam composition of the wedge 50 is minimized by the narrower dimension at the leading edge of the wedge.

Figure 12:
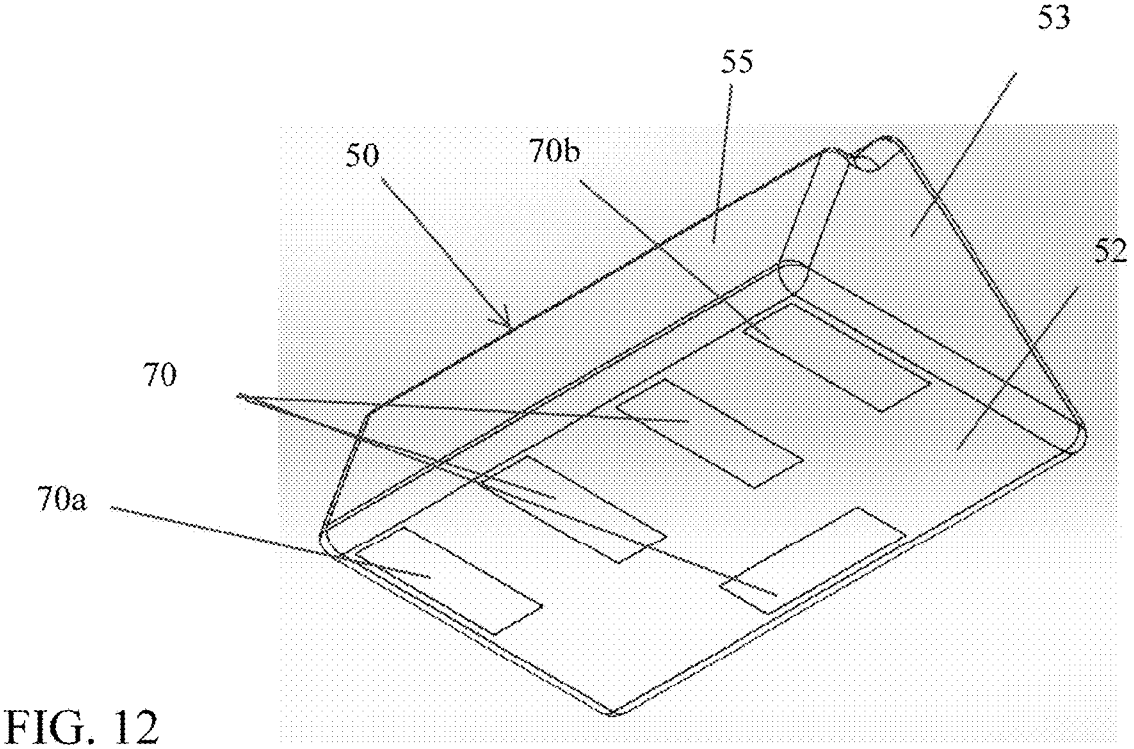

As with the conventional wedge W shown in FIG. 5, the wedge 50 can incorporate sensors 70 embedded within the wedge, as shown in FIGS. 11-12. The sensors can be configured like the pressure sensors 10 described above, with each sensor including a control circuit 12 powering a force-sensitive resistor strip 11, a control chip 16 and a transmitter 18. The sensors can be provided in different arrangements or patterns across the bottom surface, as reflected in FIGS. 11-12, as well as well as in numbers different than the five sensors in the illustrated configurations. The sensors 70 are preferably embedded within the wedge 50 flush with or just inside the bottom surface 52. It is desirable that the sensors do not interfere with the surface of the bottom surface so as to avoid jeopardizing the tackiness feature of the wedge. On the other hand, the sensors are preferably as close as possible to the working interface between the wedge and the bed surface in order to provide an accurate indication of the loaded or unloaded state of the wedge. The placement of the sensors can be used to determine a load pattern across the bottom surface 52 of the wedge, which can provide an indication of the patient's interface with the wedge.

As described above with respect to the sensor 10, the sensor 70 includes a transmitter to transmit a signal indicative of the loaded or unloaded state of the sensor to a local station L (FIG. 1). Thus, in one embodiment, the transmitter of the sensor 70 can be like the transmitter 18 enabled with Bluetooth® wireless technology, and more preferably BLE-enabled. Alternatively, the sensor 70 can be passive, low-power or ultra-low-power, such as by the use of a passive EPC Gen 2 UHF RFID tag. In this embodiment, the sensor does not include a self-powered antenna and is not capable of transmitting the sensor data to the local station L. Instead, an RFID reader is provided that reads the RFID tag of the sensor. The reader can be a reader R associated with the local station L, as depicted in FIG. 1, which is periodically activated by the local station L to read the nearby RFID tag. The UHF RFID tag of the sensors 70 has a line-of-sight range of 30 ft. It is contemplated that the range of the tag embedded within a wedge 70 is about 15 ft, which is well-within the distance between the bed B and the local station in the patient's room. Alternatively, the reader can be a hand-held reader that can communicate with the local station or that can download and store the sensor data to be uploaded at the local station L, or central station H. It is contemplated that each of the sensors S1-S7 can be passive and equipped with an RFID tag. The RFID reader would be capable of discerning the device-specific RFID tag in a known manner.

In a further feature, each of the sensors 70 is provided with a unique identifier so that the RFID reader can discern which sensor is providing data. Two of the sensors, namely sensors 70*a* and 70*b*, can be used to determine the location of the particular wedge. A reader R' can be associated with the bed B, as shown in FIG. 1, and can be configured to read the sensors sequentially, including the sensors 70, 70*a*, 70*b*. The reader R' can be programmed to perform a power sweep or scan in which the read power of the reader is gradually increased until an RFID tag of one of the sensors is detected. The read power is then increased until the next RFID tag is detected and so on until all of the sensors have been read. With respect to the sensors 70*a*, 70*b*, the sensors are at opposite ends of the wedge 50 so that one of the sensors 70*a*, 70*b* will necessarily be detected before the other when the wedge 50 is in use. Specifically, with the reader R' at one end of the bed, the power sweep will detect sensor 70*a* first, for instance, when the wedge is on the right side of the patient P in the bed. When the wedge is on the left side of the patient, the sensor 70*b* will be detected first. Since the sensors 70*a*, 70*b* have unique identifiers the right or left location of the wedge can be determined. Moreover, since the power sweep can be calibrated to a distance from the RFID reader R', the location of the wedge along the length of the bed B can be determined. More particularly, the location of the wedge relative to the patient's body can be found so that it can be determined whether the wedge is being used at the patient's thigh, hip or torso.

Figure 13:
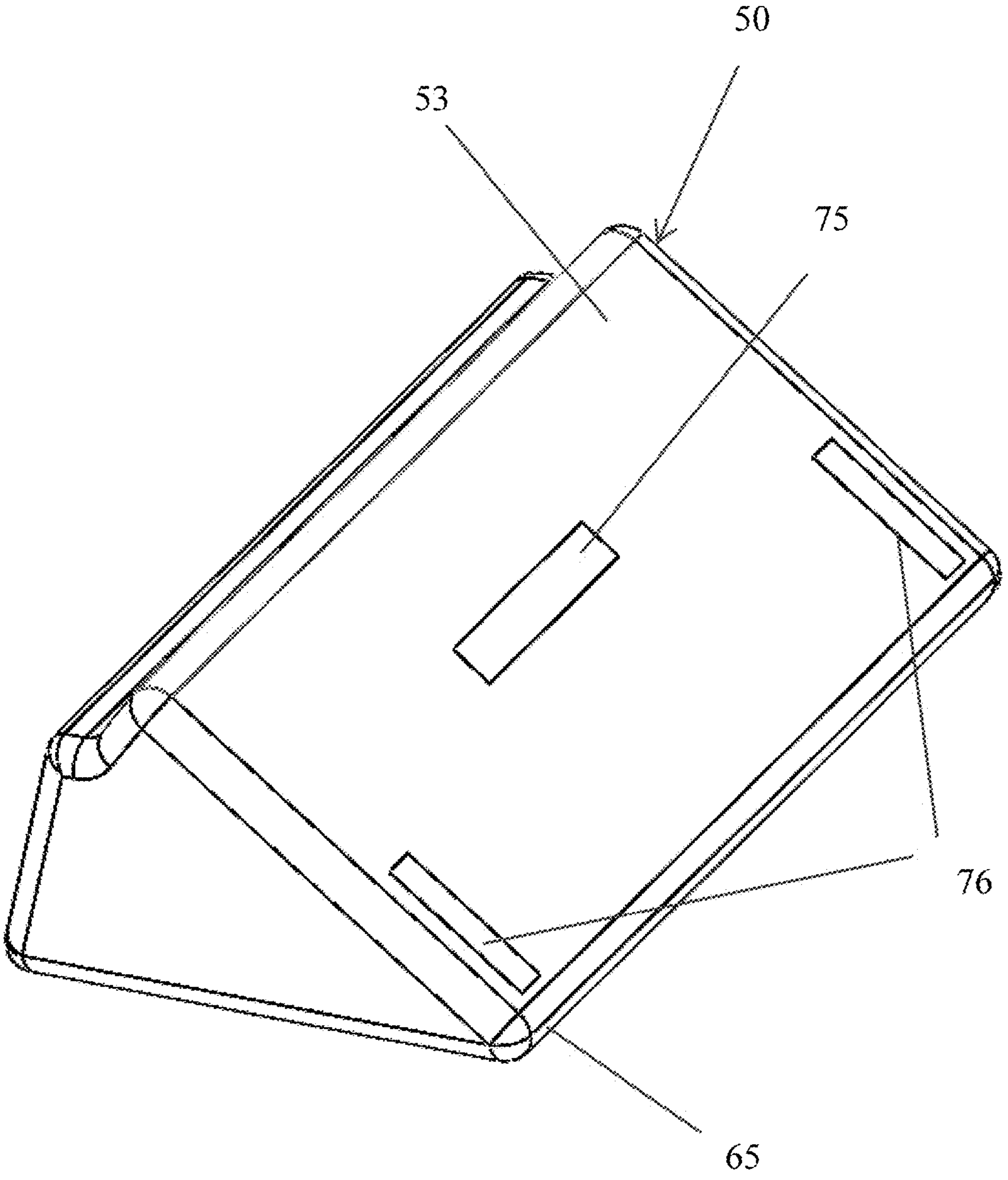
FIG. 13 is a front perspective view of the positioning wedge of FIGS. 9-10 provided with additional sensors at the ramp surface of the wedge.

The wedge 50 may also be provided with sensors on, at or just beneath the ramp surface 53, as shown in FIG. 13. In particular, a sensor 75 can be configured to detect a temperature at the ramp surface. This temperature sensing feature can be used to determine if the patient is in contact with the wedge and/or to track the patient's contact temperature. Sensors 76 can be provided on the ramp surface 53 near the bull nose 65 that are adapted to sense moisture. The amount of moisture can be used to determine whether it is merely sweat or whether the patient has soiled the wedge, requiring immediate cleaning of the wedge. The sensors 75, 76 can include self-powered antennae or can be RFID devices, as described above.

The present disclosure should be considered as illustrative and not restrictive in character. It is understood that only certain embodiments have been presented and that all changes, modifications and further applications that come within the spirit of the disclosure are desired to be protected.

What is claimed is:

1. A patient compliance monitoring system for monitoring patient compliance in a hospital room comprising:

a plurality of different types of patient care and recovery devices in the hospital room to be used for a treatment of a patient during a stay in the hospital room, each of the devices configured to require user intervention by the patient and/or by a caregiver to periodically change a manner of usage of the devices in the treatment during the stay, wherein the plurality of different types of devices is selected from a positionable bed, a patient positioning wedge, a DVT-prevention compression device, a heel protector device, an incentive spirometer and an oral care device;

a sensor associated with each of the plurality of different types of patient care and recovery devices configured to detect a usage history of the associated device in the treatment of the patient and to generate usage data therefore, wherein the usage history includes the manner of usage and at least an amount of time that the associated patient care and recovery device is in use in the treatment of the patient in the manner of usage;

a transmitter associated with each sensor operable to transmit the usage data of the corresponding sensor;

a local station associated with the hospital room for receiving the usage data from each sensor and configured to transmit the usage data for the patient for remote storage and access outside the hospital room.

2. The patient compliance monitoring system of claim 1, wherein the transmitter of each sensor and the local station include transmitting and receiving devices enabled with Bluetooth® wireless technology.

3. The patient compliance monitoring system of claim 1, wherein the remote storage is Cloud-based storage.

4. The patient compliance monitoring system of claim 1, further comprising a central station for a medical care facility including the hospital room, the local station and central station connected by a local transmission network for transmission of the patient usage data from the local station to the central station.

5. A method for monitoring patient compliance of a patient during a stay in a hospital room comprising:

providing the patient with a plurality of different types of patient care and recovery devices in the hospital room to be used in a treatment of the patient during the stay in the hospital room, wherein the plurality of different types of devices is selected from a positionable bed, a patient positioning wedge, a DVT-prevention compression device, a heel protector device, an incentive spirometer and an oral care device, periodically changing a manner of usage of each of the plurality of different types of devices in the treatment of the patient during the stay by user intervention by the patient and/or by a caregiver;

detecting a usage history of each of the plurality of different types of devices in the treatment of the patient by a corresponding sensor for each of the plurality of different types of devices and generating usage data therefore, wherein the usage history includes the manner of usage and at least an amount of time that each of the plurality of different types of devices is in use in the treatment of the patient in the manner of usage;

transmitting the usage data from the corresponding sensor for each of the plurality of different types of devices to a local station associated with the hospital room; and periodically displaying the usage history for each of the plurality of different types of patient care and recovery devices for the patient to monitor patient compliance in the usage of the plurality of different types of devices.

* * * * *